United States Patent
Stinauer et al.

(10) Patent No.: US 7,407,035 B2
(45) Date of Patent: Aug. 5, 2008

(54) SPLIT SHELL SYSTEM AND METHOD FOR HEARING AIDS

(75) Inventors: Robert Stinauer, Arlington Heights, IL (US); Erik Lindberg, Hampshire, IL (US); Michael Haberman, Evanston, IL (US); Roman Klyachman, Des Plaines, IL (US); Russell Lee Schreiner, Park Ridge, IL (US); James R. Anderson, Chicago, IL (US)

(73) Assignee: GN ReSound A/S, Taastrup (DK)

( * ) Notice: Subject to any disclaimer, the term of this patent is extended or adjusted under 35 U.S.C. 154(b) by 857 days.

(21) Appl. No.: 10/374,506

(22) Filed: Feb. 25, 2003

(65) Prior Publication Data

US 2003/0221902 A1 Dec. 4, 2003

Related U.S. Application Data

(60) Provisional application No. 60/360,387, filed on Feb. 28, 2002.

(51) Int. Cl.
*H04R 25/00* (2006.01)

(52) U.S. Cl. ..................... 181/135; 181/129

(58) Field of Classification Search .......... 181/129–137
See application file for complete search history.

(56) References Cited

U.S. PATENT DOCUMENTS

| | | | |
|---|---|---|---|
| 1,953,437 A * | 4/1934 | Schier | 181/135 |
| 4,443,668 A * | 4/1984 | Warren | 455/351 |
| 4,962,537 A | 10/1990 | Basel et al. | 381/68.6 |
| 5,146,051 A | 9/1992 | Hermann | 181/130 |
| 5,195,139 A * | 3/1993 | Gauthier | 381/322 |
| 5,487,012 A | 1/1996 | Topholm et al. | 364/474.05 |
| 6,144,750 A * | 11/2000 | Levin | 381/328 |
| 6,205,227 B1 * | 3/2001 | Mahoney et al. | 381/328 |
| 6,393,130 B1 * | 5/2002 | Stonikas et al. | 381/322 |
| 6,532,295 B1 * | 3/2003 | Brimhall et al. | 181/135 |
| 7,113,611 B2 * | 9/2006 | Leedom et al. | 381/322 |
| 2001/0043707 A1 | 11/2001 | Leedom | 381/312 |
| 2002/0025055 A1 * | 2/2002 | Stonikas et al. | 381/322 |

FOREIGN PATENT DOCUMENTS

| | | |
|---|---|---|
| WO | WO 01/08443 A2 | 2/2001 |
| WO | WO 01/41503 A2 | 6/2001 |
| WO | WO 01/69973 A2 | 9/2001 |
| WO | WO 02/25993 A1 | 3/2002 |

* cited by examiner

*Primary Examiner*—Kimberly R Lockett
(74) *Attorney, Agent, or Firm*—Welsh & Katz, Ltd.

(57) ABSTRACT

An in-the-ear hearing aid has a housing with an audio input end and an audio output end. The housing is formed of two sections which are coupled together along a seam which extends between the two ends. An elastomeric sheath can enclose the housing.

38 Claims, 16 Drawing Sheets

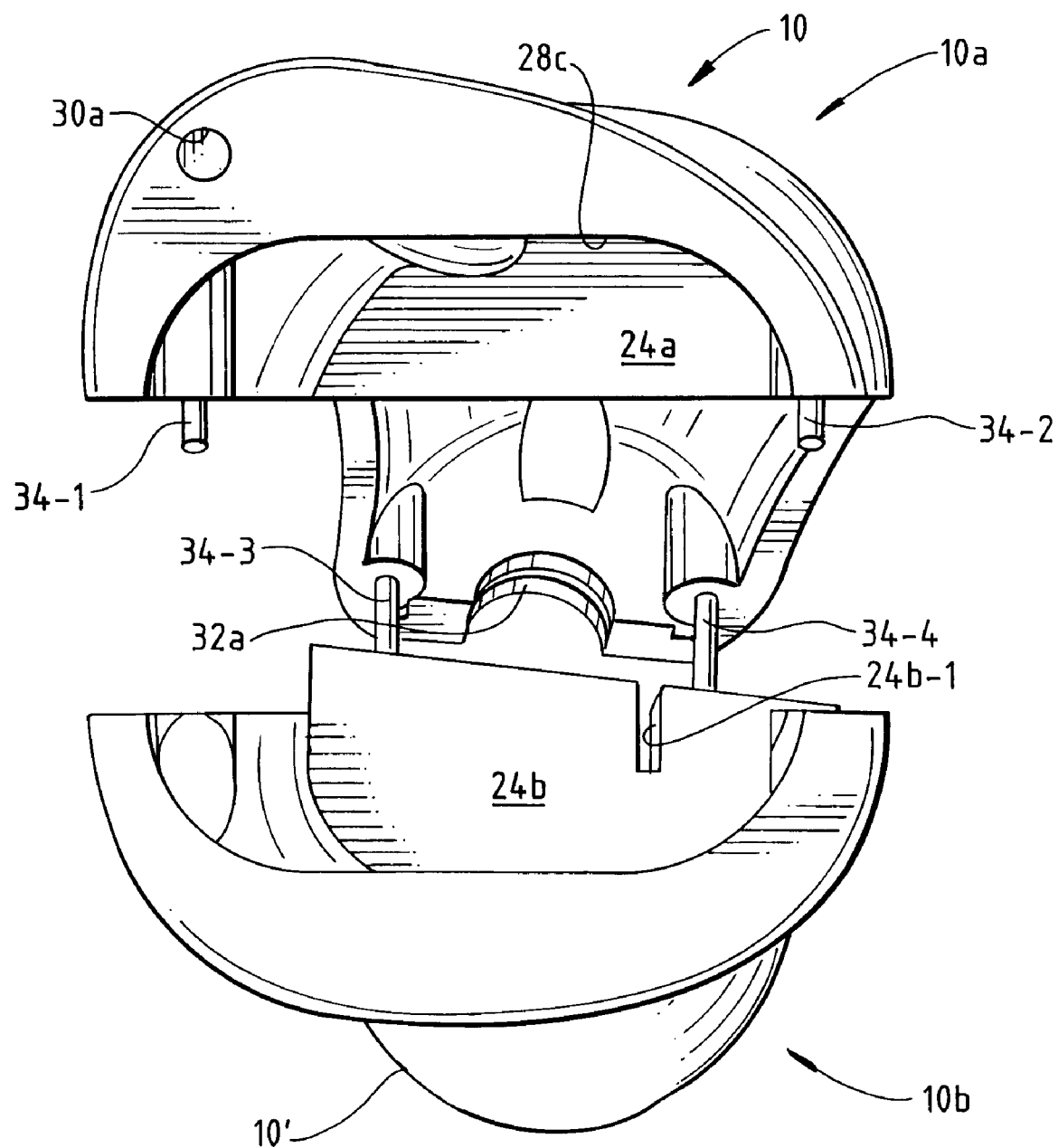

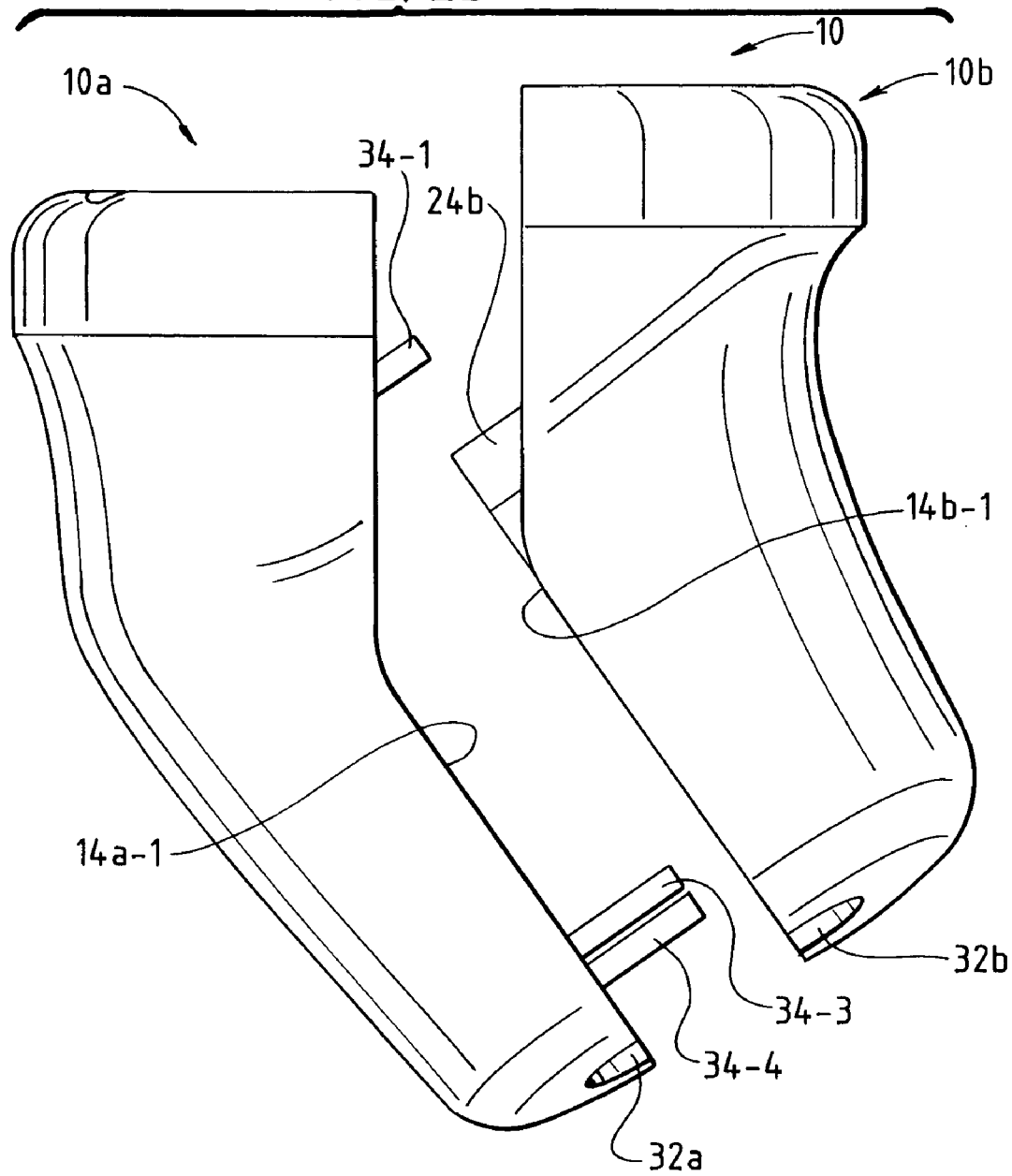

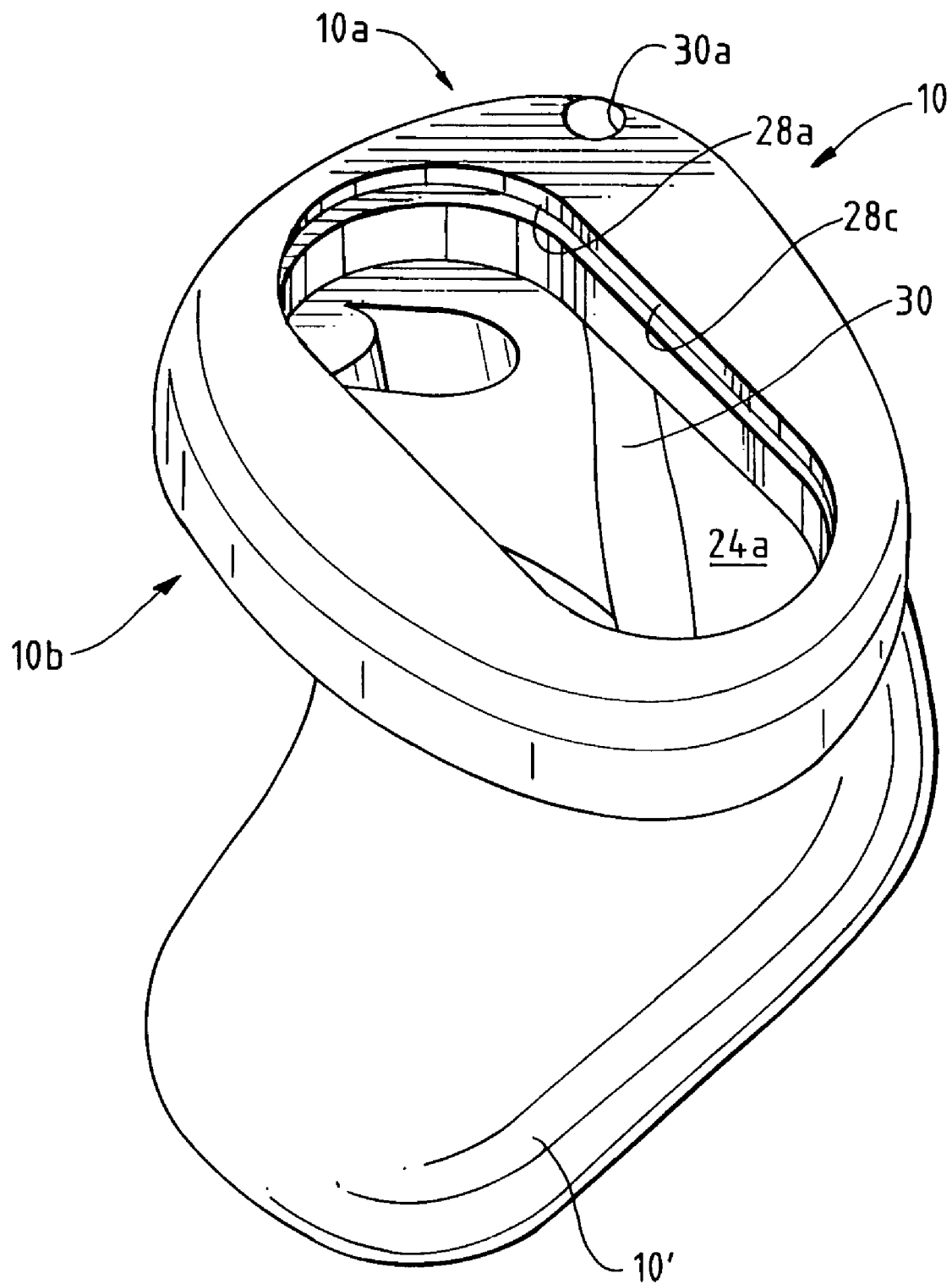

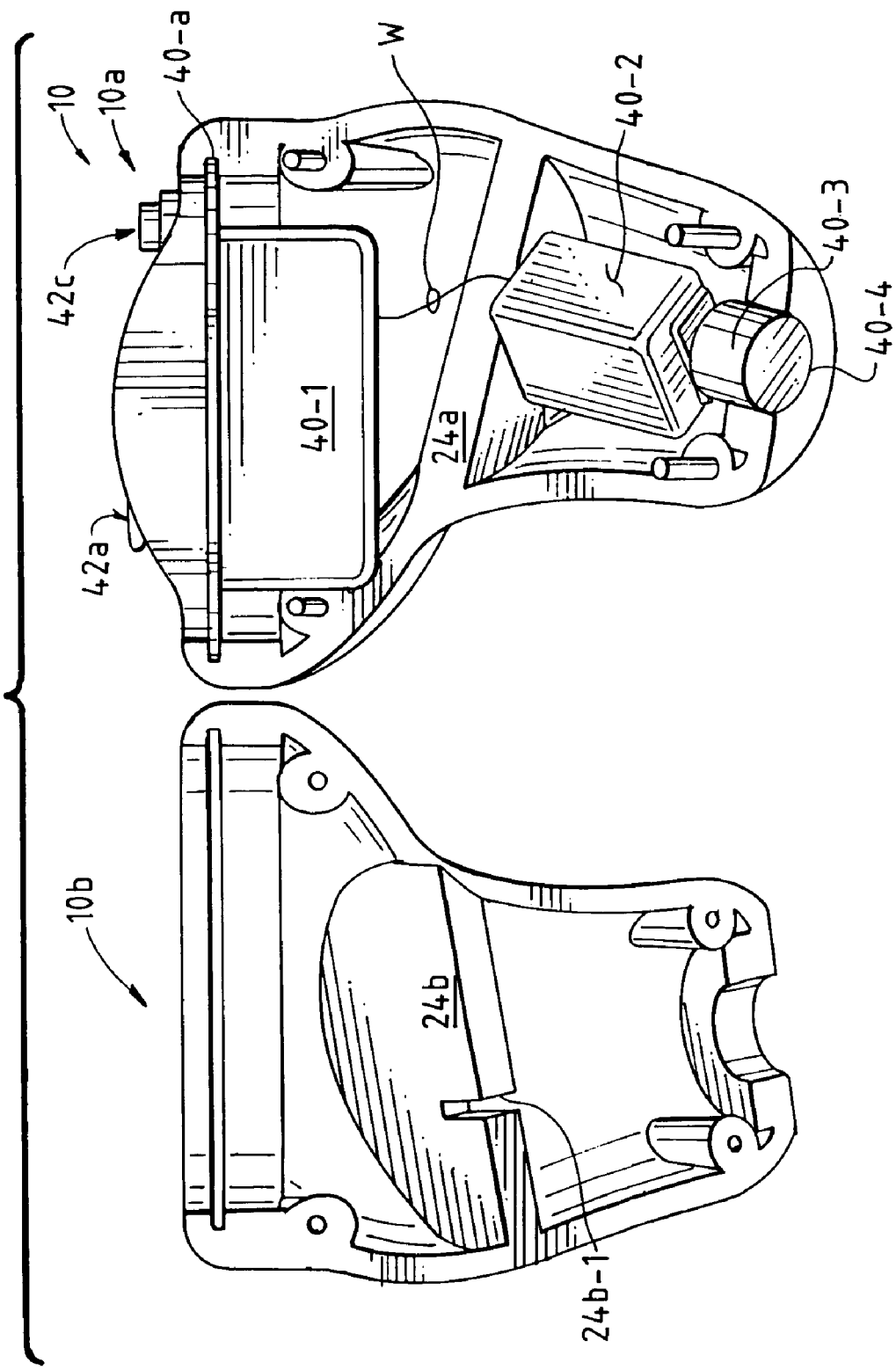

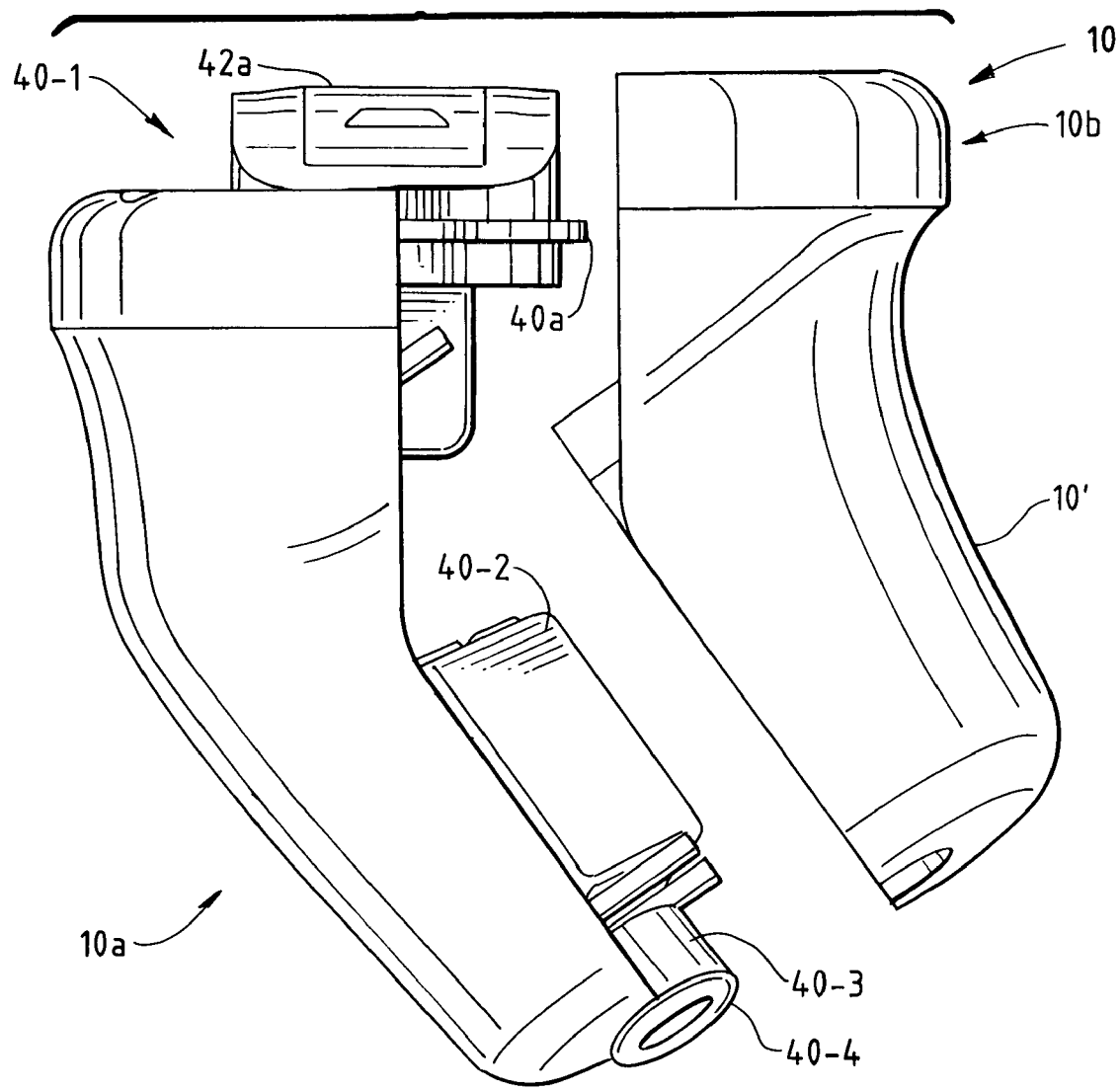

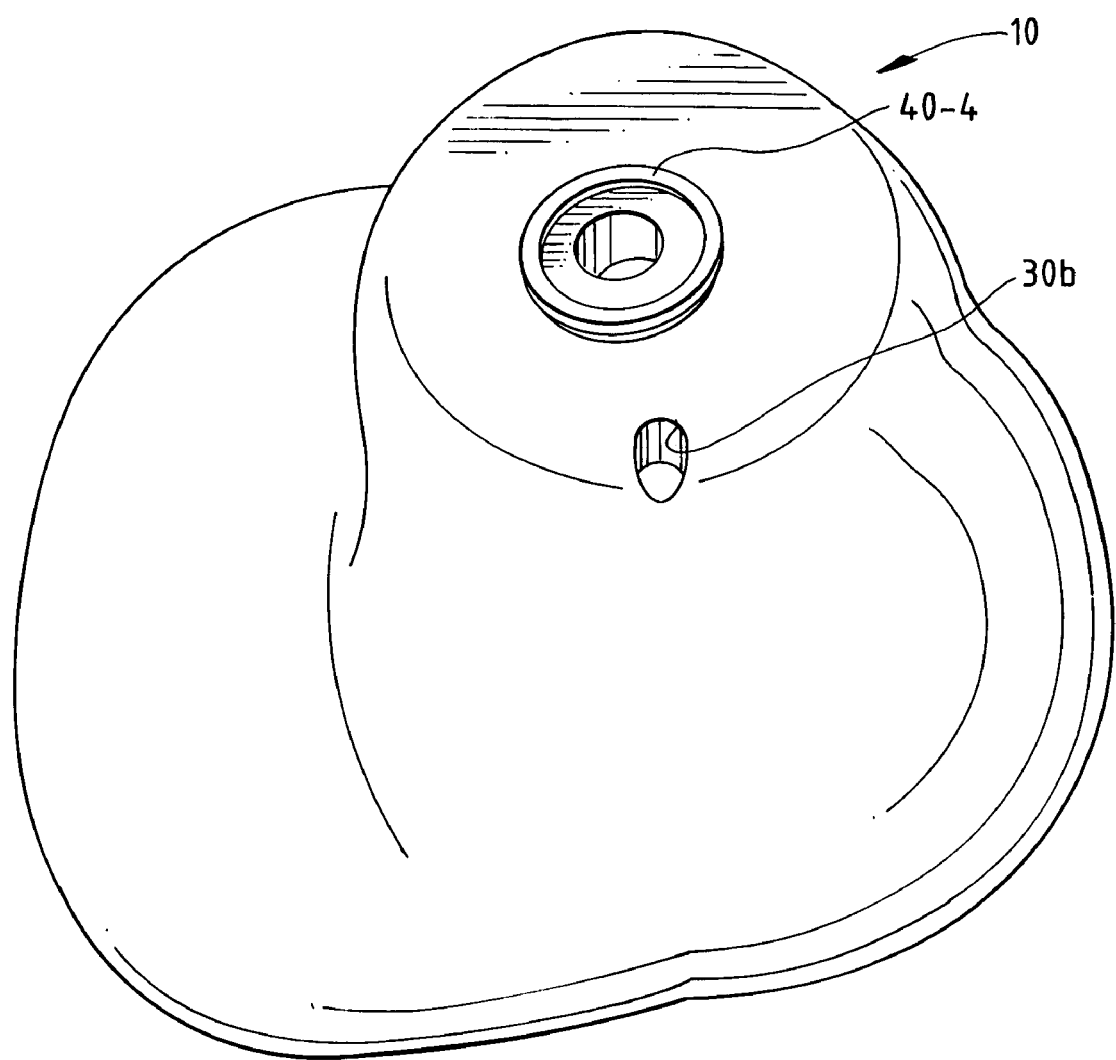

SPLIT SHELL SYSTEM AND METHOD FOR HEARING AIDS

The benefit of the Feb. 28, 2002 filing date for Provisional Patent Application Ser. No. 60/360,387 is hereby claimed.

FIELD OF THE INVENTION

The invention pertains to hearing aids that are intended to extend at least in part into the user's ear canal. More particularly, the invention pertains to such hearing aids formed of two locked together housing sections in the absence of a face plate.

BACKGROUND OF THE INVENTION

For a number of years it has been common to manufacture in-the-ear, or in-the-canal hearing aids with a hollow body section, custom designed with an exterior periphery intended to match the curvature of the user's ear canal. The hollow body section usually is bounded on all sides but one. Components such as a receiver are inserted through the open side. The receiver has an audio output port which is usually oriented toward the end of the housing intended to have an audio output port.

The open side is closed with a face plate which usually carries some or all of the remaining necessary components such as a microphone, audio processing circuitry and a power supply such as a battery. The output of the audio processing circuitry is coupled during manufacture to an input port of the receiver.

The face plate is attached to the body section along a laterally directed seam using a variety of mechanical and/or adhesive solutions. Mechanical solutions have included clamps of various types which enable the face plate to grip the open end of the body section. Adhesives have also been used to strengthen the joint.

The above constructions produce a seam that is laterally oriented relative to an axis which extends between the ends. This seam must be mechanically strong enough to resist extraction forces applied to the face plate after the aid has been inserted into the user's ear canal.

The above construction presents manufacturing difficulties. The body section is usually small and is bounded on all sides but the one where the face plate is ultimately attached. Hence, assembling components, such as the receiver or audio processing circuitry into the housing section can be difficult, requiring skill and experience. This results in manufacturing expense and can present reliability problems. In addition, the housing sections are unique as they represent the shape of parts of the user's ear canal, no two of which are the same. This further complicates the assembly process as components are constantly being installed in variably shaped volumes.

There is thus a continuing need for improved hearing aids of a type that extend, at least in part, into the user's ear canal. Preferably manufacturing costs could be reduced while increasing reliability of operation of the completed unit. It would also be preferable if a larger, more open assembly work area could be provided than has heretofore been available. Finally, it would be preferable if an improved joint could be provided between the various parts of the subject hearing aid.

BRIEF DESCRIPTION OF THE DRAWINGS

FIG. 2A is a top plan view of the housing sections of FIG. 1 illustrating aspects of the relationship therebetween as those sections are connected together;

FIG. 2B is a side elevational view of the housing sections of FIG. 2A;

FIG. 3A is an isometric view of the housing sections of FIG. 1 after assembly;

FIG. 4 is a side elevational view of the housing sections of FIG. 1 with various components installed therein;

FIG. 5 is a side elevational view of the housing sections of FIG. 4 as those sections are being joined together;

FIG. 6C is a bottom view of the assembled hearing aid of FIG. 6A;

DETAILED DESCRIPTION OF THE EMBODIMENTS

Figure 1:
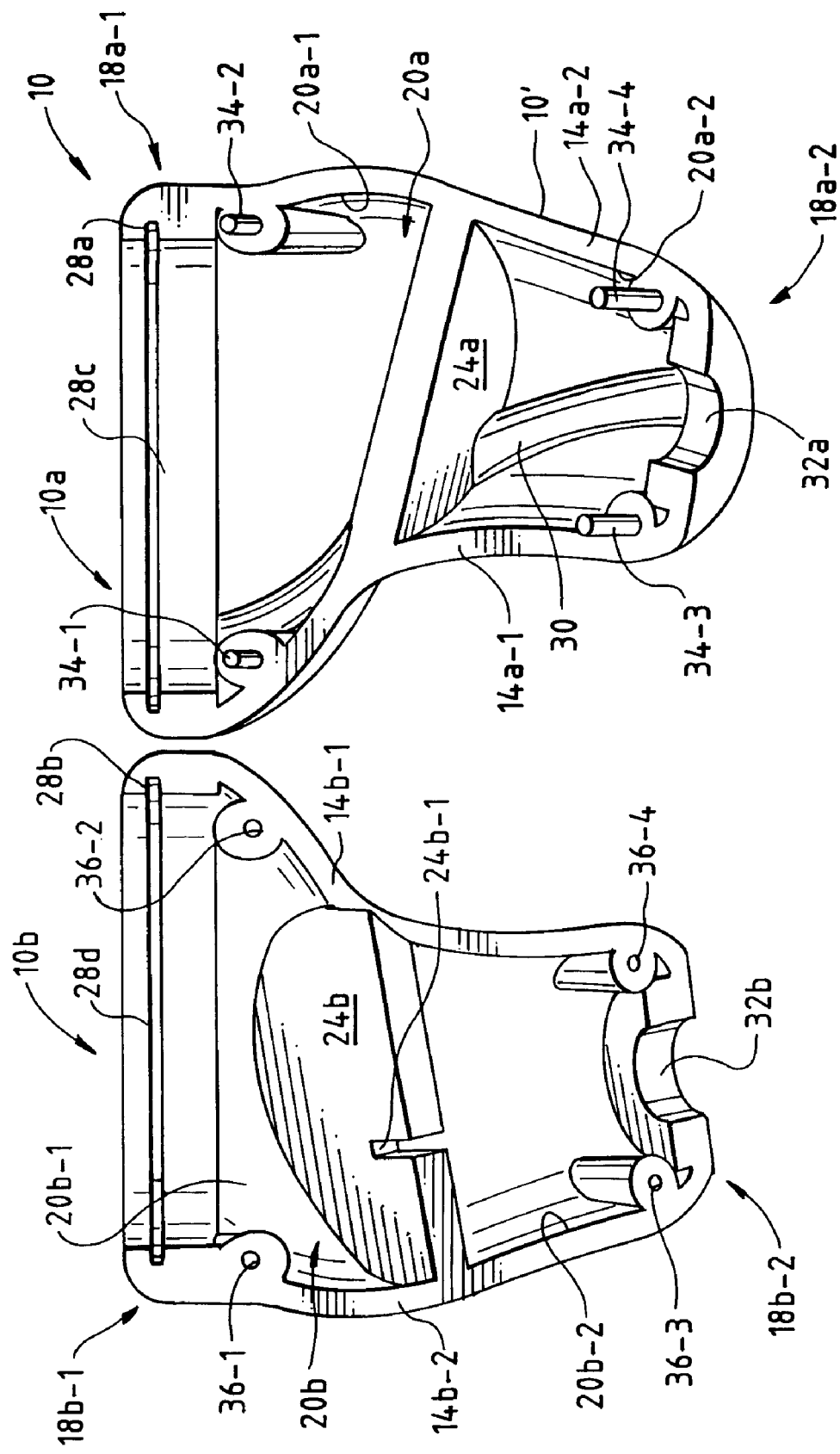
FIG. 1 is a side elevational view of a longitudinally split hearing aid housing in accordance with the present invention.

While embodiments of this invention can take many different forms, specific embodiments thereof are shown in the drawings and will be described herein in detail with the understanding that the present disclosure is to be considered as an exemplification of the principles of the invention and is not intended to limit the invention to the specific embodiment illustrated.

A hearing aid housing includes first and second sections which when assembled together, form a substantially closed hollow housing. The housing has first and second displaced ends. The housing is most useful in those hearing aids that extend, at least in part, into a user's ear canal. These include in-the-ear, in-the-canal, and completely-in-the-canal hearing aids. In such aids, the portion of the housing that extends into the ear canal is usually, but need not be, shaped to closely conform to the shape of the user's ear canal.

One end of the housing is intended to be inserted into the user's ear canal, directed toward the ear drum. This end usually has an audio output port. The other end extends toward the user's outer ear and may include a battery door, an audio input port coupled to a microphone and various adjustments.

The two housing sections interface along a seam which defines a curve that extends axially between the two ends. This housing has no face plate. Each section contributes to forming each of the ends. Alternately, the seam can extend transversely between the ends.

Each section is formed with a concave central region bounded by spaced apart end regions. When the sections are coupled together, the concave central regions form an internal component receiving volume. The respective mating end regions substantially close the internal volume.

The seam formed between the two sections is generally transverse to the seam formed between the prior art face plates and respective housings. As a result, when the present hearing aid is extracted from a user's ear canal the extraction forces are generally parallel to the seam and not transverse thereto as is the case with prior art face plates. Therefore, different and simpler mechanical strategies can be used to lock the two sections together as that seam is protected from and better able to withstand the extraction forces. This structure also makes it possible to eliminate any need to use adhesives to join the housing sections together.

Another advantage of the present hearing aid is that the split housing configuration facilitates assembly. The interiors of both housing sections are exposed and the curvatures are shallower than is the case of prior art housings closed with face plates. Hence, there are no deep interior volumes into which components must be installed. In addition, mounting features having standardized component receiving surfaces can be formed on the interior, concave shapes. The various components such as microphone, speech processing circuits, battery support and receiver can be installed on the standardized surfaces before the housing sections are coupled together. The interconnected components can also be tested prior to coupling the housing sections together.

In one disclosed embodiment, only two discrete components need be installed in the respective section. One component is the receiver, the other is a module which includes an audio input port, a microphone, speech processing circuitry, and a battery compartment. The output from the speech processing circuitry is coupled to the receiver via conducting wires.

The module can carry manually manipulatable adjustment elements. The module can also carry a battery access door.

FIG. 1 illustrates an embodiment of a shell or housing 10 of an in-the-ear or in-the-canal hearing aid in accordance with the invention. The shell or housing 10 as illustrated in FIG. 1 is formed of two sections 10a, 10b.

The exterior periphery 10' of the shell 10 replicates the shape of a portion of a user's ear canal and a portion of the outer ear. Shell 10 can be formed in either two separate sections 10a, 10b. Alternately, it can be formed as a single unitary housing with an exterior periphery 10' which is then split into the two sections 10a, 10b.

It will be understood that the exact methodology of forming the over-all shape of the housing 10 and/or forming the two sections 10a, 10b are not limitations of the present invention. Various methods as would be would be known to those of skill in the art can be used for this process. Among other methods, known forms of stereolithography could be used to manufacture shells, such as the shell 10 which have an external periphery and an aspect ratio which accurately duplicate portions of the ear canal and the outer ear of the respective user.

When assembled, sections 10a, 10b mate along a laterally oriented seam line defined by surfaces 14a-1, -2 and 14b-1, -2. As described below the molded housing sections bound two substantially closed, component receiving regions.

The sections 10a, 10b each form a portion of the substantially closed shell or housing 10 and define first and second ends 18a-1, -2 and 18b-1, -2. The first, or proximal, ends 18a-1, 18b-1 each join together to partially enclose the proximal or outer ear portion of the housing 10. Similarly, second, or distal, ends 18a-2, 18b-2 join together to partially close the distal or canal end of the housing 10.

Sections 10a, 10b define relatively shallow elongated concave interior surfaces such as surfaces 20a and 20b such that when the sections 10a, 10b are joined together, substantially closed interior component receiving regions are formed.

Sections 10a, 10b also include feedback reducing wall sections 24a and 24b which are integrally formed with the sections 10a, 10b to separate a proximal interior region 20a-1, 20b-1 from a distal region 20a-2, 20b-2. The walls 24a, b reduce feedback between a receiver located in the distal region formed of sections 20a-2, 20b-2, best seen in FIG. 4, from other electrical components located in the proximal region formed of sections 20a-1, 20b-1. A slot 24b-1 provides a path between the two component receiving regions for electrical wiring.

Advantages of the housing 10 include the fact that the respective components can be installed adjacent respective ends 18a-1 and 18a-2 notwithstanding the presence of wall member 24a. Subsequently, when the sections 10a, 10b are joined together, the interior wall formed of sections 24a, b completely separates the two groups of components from one another.

The housing sections 10a, 10b also define component receiving support features, such as grooves 28a, 28b formed in respective proximal ends 18a-1, 18b-2 thereof. It will be understood that while grooves or slots 28a, b are illustrated, other component receiving and supporting shapes or features could be used without departing from the spirit and scope of the invention. Surfaces 28c, d bound an open proximal end region from which an electronic module extends, in part as discussed below. Receiver component supports can be integrally formed in one or both of regions 20a-2, 20b-2, depending on the over-all shape, form factor and mounting requirements of the respective receiver, best seen in FIGS. 4 and 8.

A vent 30 can be integrally formed in one of the sections, such as section 10a. The vent 30 extends from proximal end 18a-1, port 30a, see FIG. 2A, through the bounded interior region 20a-1, b-1 through the wall 24a to the distal end 18a-2, port 30b, best seen in FIG. 3C. The integrally formed vent thus extends between the ends of section 10a and is particularly desirable from a manufacturing standpoint since no separate tubing need be inserted into the shell or housing 10 during the manufacturing process.

The distal ends 18a-2, b-2 also define an audio output port having surfaces, 32a, 32b from which audio emanates into the user's ear canal.

FIGS. 2A and 2B, a top view as well as a side elevational view of the sections 10a, 10b prior to assembly illustrate the laterally oriented seam line formed of surfaces 14a-1, 14b-1 and 14a-2, 14b-2. As illustrated in FIG. 2A, wall sections 24a, b come together to separate the two internal regions from one another.

The sections 10a, 10b can be mechanically joined together with, for example, an interference, or press fit, via a plurality of studs 34-1, -2, -3 and -4. The studs 34-1 . . . -4 can be integrally formed during the formation of section 10a or added subsequently. The studs 34-1 . . . -4 slidably engage openings 36-1 . . . -4 in section 10b with an interference fit. Other latching structures usable to join sections 10a, 10b are discussed subsequently. The exact latch structure is not a limitation of the invention.

Figure 3B:
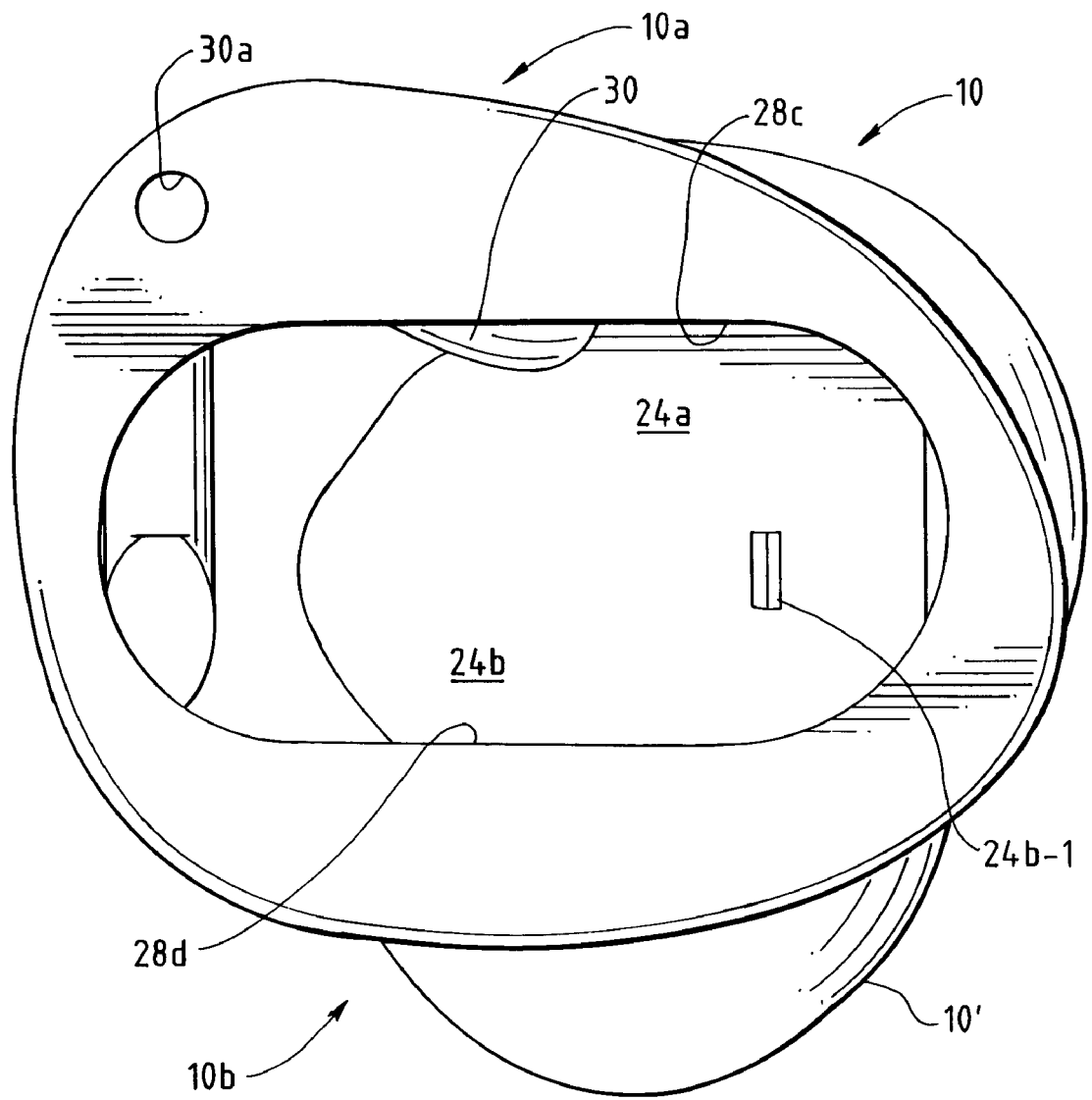
FIG. 3B is a top plan view of the assembled housing sections of FIG. 3A.
Figure 3C:
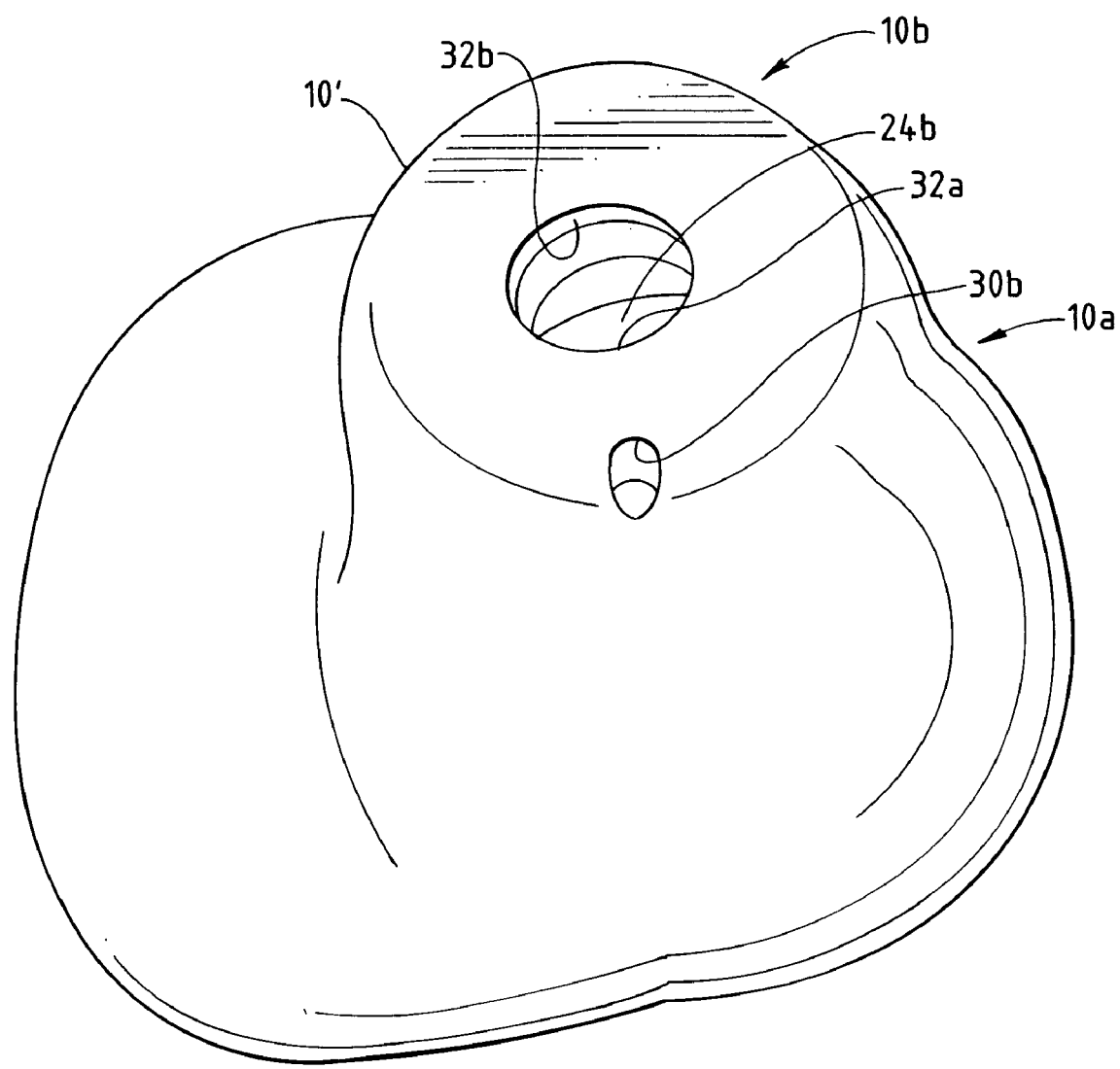
FIG. 3C is a bottom view of the assembled sections of FIG. 3A.

FIGS. 3A, 3B and 3C illustrate various views of the sections 10a, 10b jointed together to form a substantially closed housing with an exterior periphery 10' which, perferably corresponds to the shape of the user's ear canal. It will be understood that the shell 10 could be formed for use as in-the-ear hearing aid, an in-the-canal hearing aid, or a completely in-the-canal hearing aid or any variation thereof without limitation. The exterior periphery 10' can be formed so as to replicate the interior shape of the respective portion of the user's ear canal and adjacent adjacent outer ear depending on the selected style. It will be understood that neither the selected style nor the material of which the sections 10a, 10b is formed are limitations of the present invention.

As illustrated in FIGS. 3A, 3B, sections 10a, 10b each contribute to partially enclosing proximal end 18a-1 and distal or canal end 18a-2. As illustrated in FIG. 3B, when sections 10a, 10b are joined together, wall sections 24a, 24b mate so as to completely isolate proximal region 20a-1, 20b-1 from distal end region 20a-2, 20b-2.

FIG. 4 illustrates sections 10a, 10b with section 10a carrying an electronic module 40-1 which is slidably received in slots 28a, a receiver (audio output transducer) 40-2 mounted in port 32a with a mounting tube or support of a conventional variety 40-3. A wax guard 40-4 can be attached to tube 40-3. The bounding wall section 24a separates electronic module 40-1 from receiver 40-2 as described above.

Figure 6A:
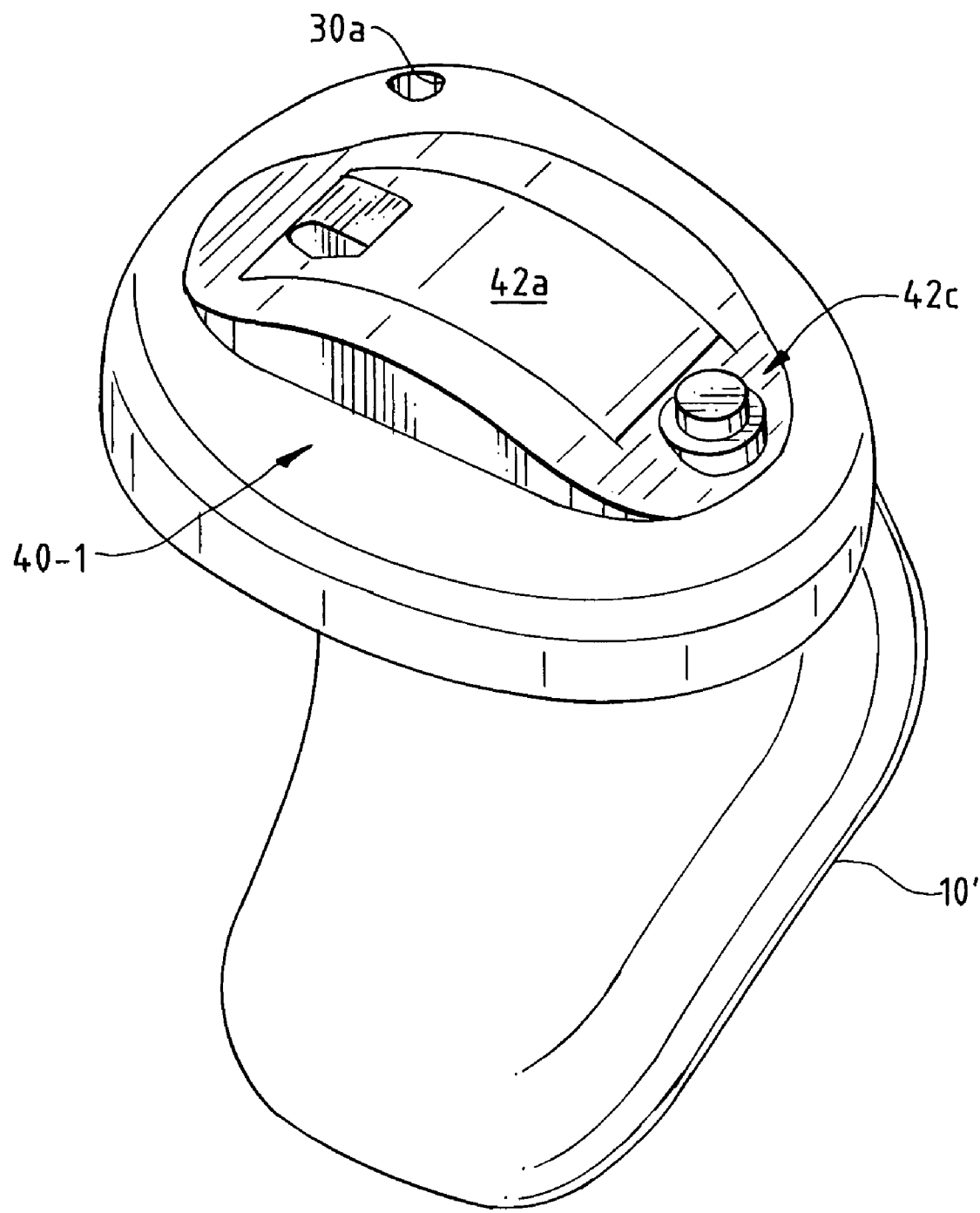
FIG. 6A is a perspective view of a hearing aid incorporating the housing sections of FIG. 4 after assembly.

The module 40-1 incorporates a battery container closed by a rotatable door 42a, see FIGS. 5A and 6A, which can be opened to replace the battery. The module 40-1 also incorporates an audio input port 42b, see FIG. 6B, which is coupled to a microphone carried therein. The output of the microphone is in turn coupled to the audio processing circuitry of a type appropriate for dealing with the user's hearing deficiency. Outputs from the audio processing circuitry are in turn coupled via electrical conductors W through slot 246-1 to the receiver 40-2.

The module of 40-1 also carries on/off and/or volume adjustments 42c as well as other adjustments as would be known to those of skill in the art. The module 40-1 can be completely assembled and tested before being positioned in section 10a. It can also be connected to the receiver 40-2 and that assemblage can be tested ahead of time. The assembled modules 40-1 and 40-2 are retained in their respective positions relative to one another and relative to the housing 10 when the sections 10a, 10b are joined together as illustrated in FIGS. 5 and 6A.

Figure 6B:
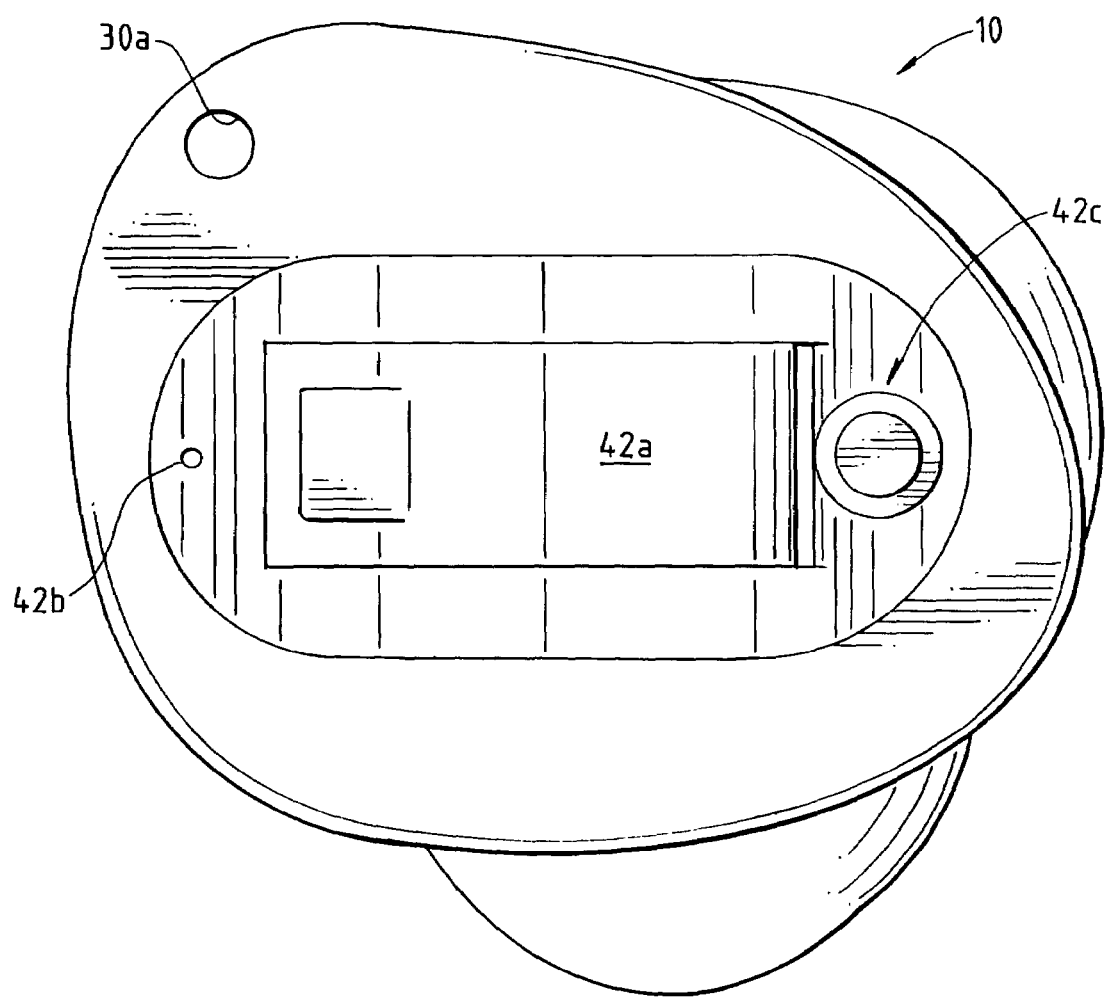
FIG. 6B is a top plan view of the assembled hearing aid of FIG. 6A.

FIGS. 6A, 6B and 6C illustrates various view of a hearing aid incorporating the housing 10 and exhibiting the predetermined external periphery 10' which is compatible with the shape of the user's ear canal. It will be understood that in addition to forming the external periphery 10' to be compatible with a specific user's ear canal, the periphery 10' could be formed with a general shape that could be used with various different ear canals without departing from the spirit and scope of the present invention.

Figure 7:
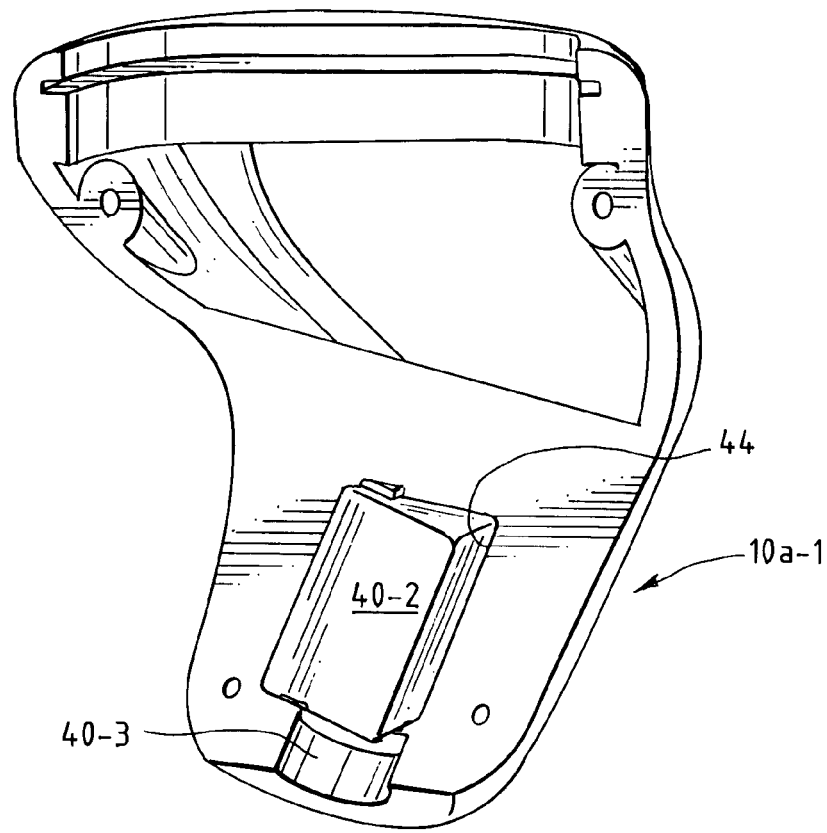
FIG. 7 is a perspective view of a housing section illustrating an alternate form of receiver mount.

FIG. 7 illustrates an alternate mounting configuration for the receiver 402. As illustrated therein, the receiver 40-2 can be mounted directly into a recess 44 created in respective section 10a-1 and coupled to the output port, such as output port 32a, with or without tube 40-3. It will be understood that for illustrative purposes only, receiver 40-2 is shown partly protruding from recess 44. Its normal position is seated in the recess 44.

The mounting configuration illustrated in FIG. 7 is a "hard" mounting configuration as the receiver 40-2 is contained in part in a recess 44 formed in the shell section 10a-1. It will be understood that the shell sections 10a, 10a-1 and 10b can be formed of rigid or elastomeric material without limitation of the present invention. Where the shell sections are formed of a substantially rigid material, the mounting recess 44 provides a non-elastomeric mount for the receiver 40-2 unlike the previously discussed elastomeric mounts using elastomeric tube 40-3 of FIG. 4.

The hard mounted receiver recess, such as the recess 44, of FIG. 7 will provide known and predictable audio characteristics which can be taken in to account by the audio processing circuitry of the module 40-1. It will also be understood that mating shell section 10b-1 would carry a recess that corresponds to recess 44 so that the receiver 40-2 is contained within the two recesses when the sections 10a-1, 10b-1 are connected together.

Figure 8:
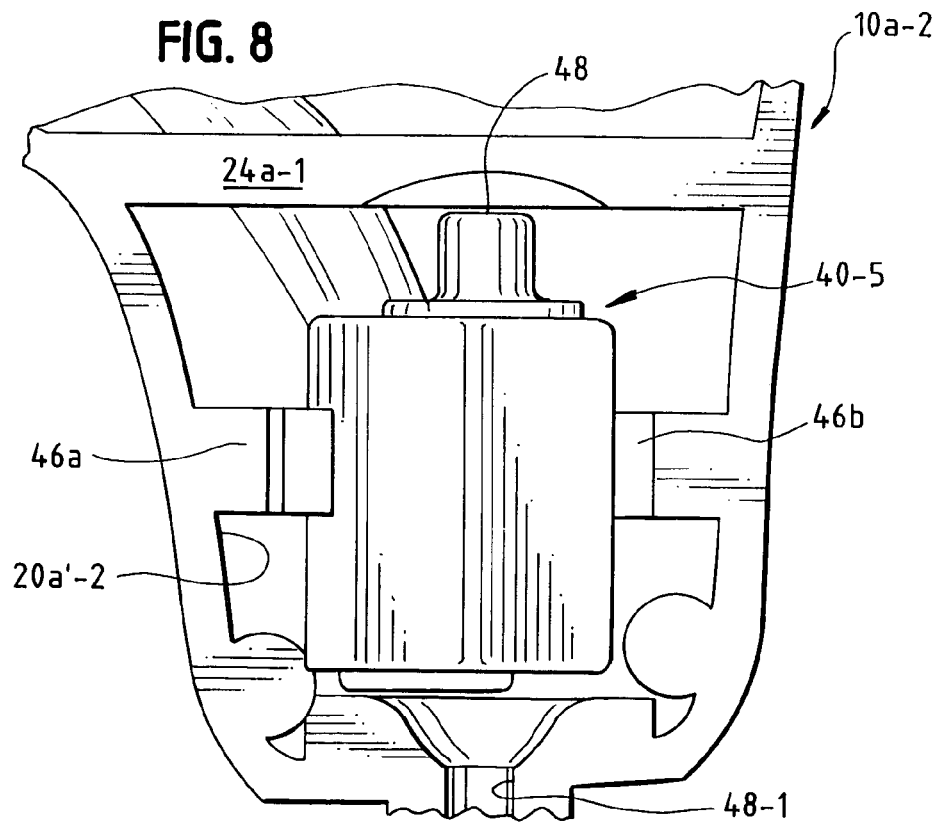
FIG. 8 is a view of yet another housing section illustrating another alternate view of a receiver mount.

FIG. 8 illustrates an alternate receiver mounting system. As illustrated in FIG. 8, a shell section 10a-2 carries integrally formed receiver mounting features 46a, b. The mounting features 46a, b could, for example, be substantially rigid and engage the respective receiver, such as receiver 40-3, with a snap-fit.

In the installation of FIG. 8, the receiver output port 48 is oriented toward the internal bounding wall 24a-1 and not toward the housing output port 48-1. The illustrated configuration provides a large internal region, 20a'-2 which is displaced from the receiver output port and into which ear wax can flow. This configuration not only enhances receiver life and performance by providing an alternate region for accumulation of ear wax, as opposed to the output port of the receiver, but also the audio output from receiver port 48 is directed toward the bounding walls 24a-1, b-1 before it is directed to the output port 48-1. The configuration of FIG. 8 enhances repeatability in audio output by minimizing the impact of ear canal variations on the actual audio output.

Figure 9:
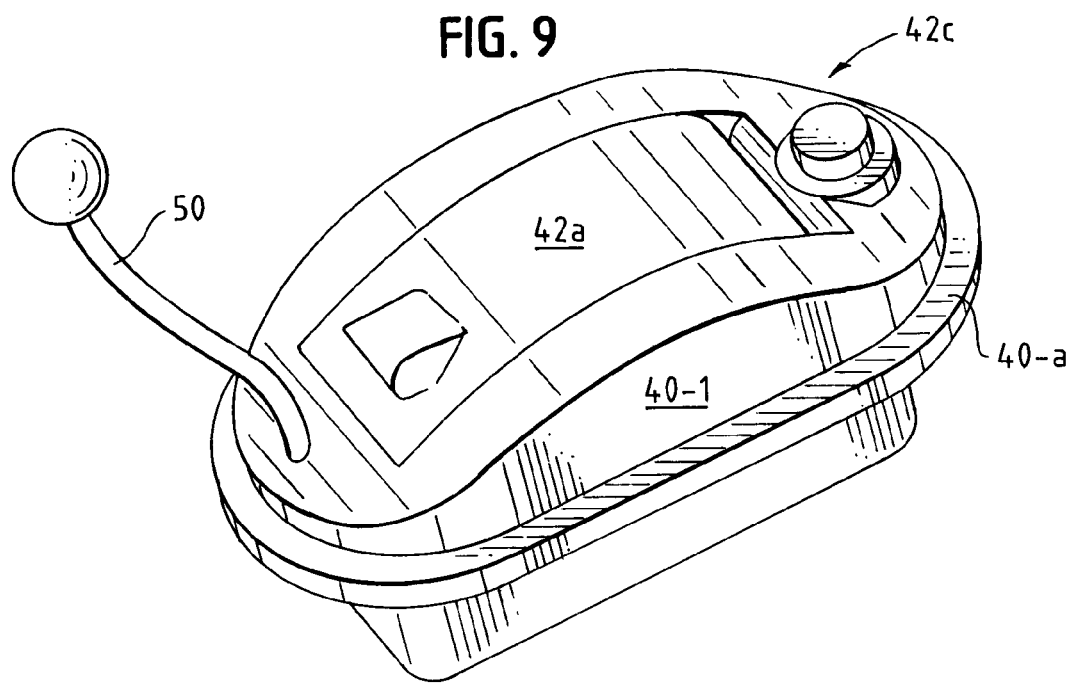
FIG. 9 is a perspective view of an electronic module for a hearing aid with an extraction member attached thereto.

FIG. 9 illustrates an extraction member 50 attached to module 40-1 to enable a user to easily remove the hearing aid housing 10 as necessary. While the extraction member or line 50 as illustrated in FIG. 9 is attached to the module 40-1, it will be understood that it could alternately be attached to proximal end 18a-1 or 18b-1. Neither the exact form of attachment, the location thereof nor the composition of the member 50 are limitations of the present invention.

Figure 10:
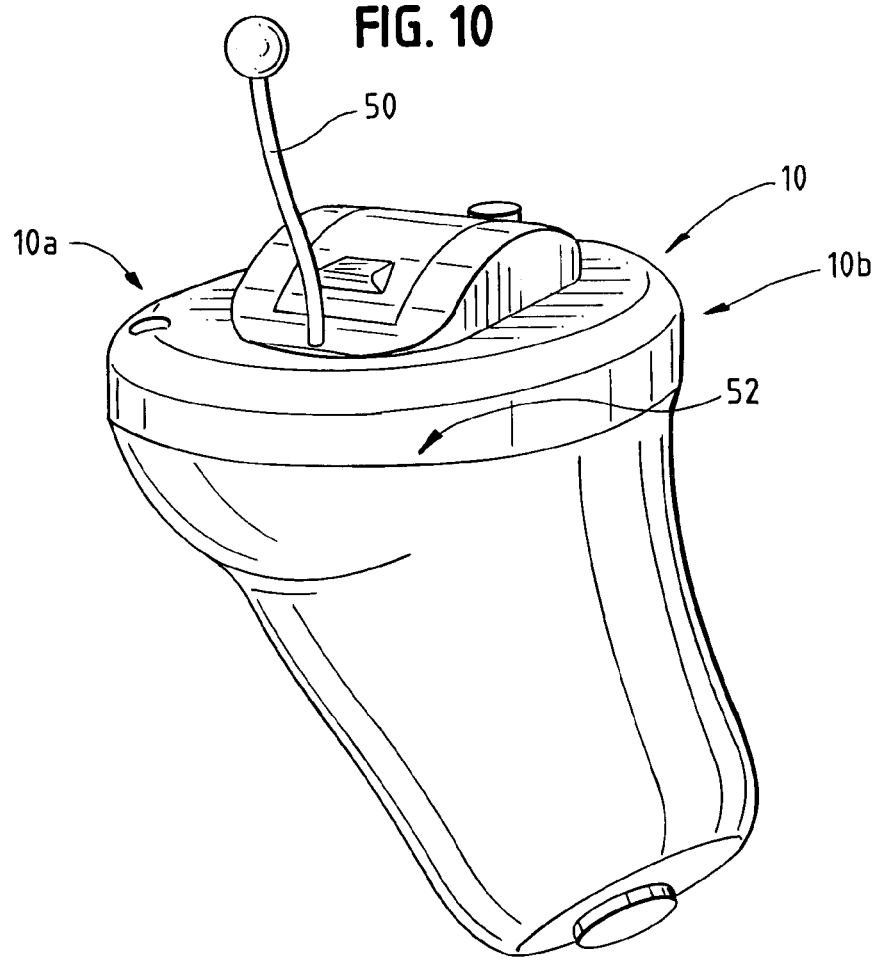
FIG. 10 is a perspective view of the hearing aid of FIG. 9B enclosed with an elastomeric sheet.

FIG. 10 illustrates the hearing aid housing 10 with the housing sections 10a, 10b surrounded in part by a layer of elastomeric sheeting 52. The elastomeric sheeting 52 can be any type of medical grade elastomer with appropriate constrictive characteristics so as to enhance the mechanical coupling between the sections 10a, 10b.

Figure 11A:
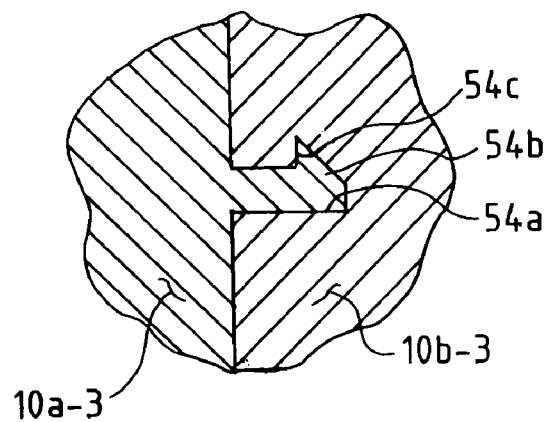
FIGS. 11A-11B illustrate alternate mechanical latches usable with the hearing aid housing of FIG. 1.
Figure 11B:
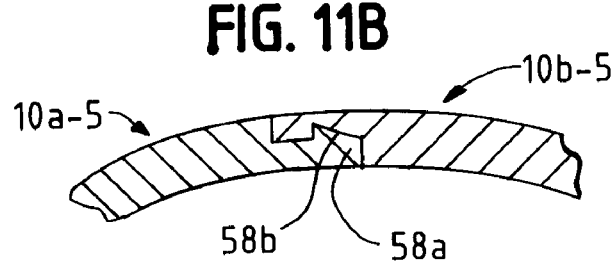

FIGS. 11A, 11B illustrate alternate forms of mechanical latching structures which can be incorporated to connect the housing sections 10a, b together. In FIG. 11A, a snap lock type of latch couples sections 10a-3 and 10b-3 together. In the exemplary embodiment of FIG. 11A, a slot 54a, formed in section 10b-3 slidably receives a barbed coupling member 54b that extends from section 10a-3. When the member 54b slides past an end surface 54c in slot 54a, the enlarged locking feature thereon abuts edge 54c preventing separation of the sections 10a-3, 10b-3.

In FIG. 11B, a snap fit latch joint is provided to latch sections 10a-5 and 10b-5 together. In FIG. 1B, an end view of the two latched sections, a deflectable latching extension member 58a can be snapped into an appropriately shaped slot 58b to mechanically latch the two sections together. It will be understood that other forms of mechanical latches come within the spirit and scope of the present invention.

It will also be understood that in addition with or as an alternate to a mechanical latching structure, selected adhesives could be used to securely lock the sections 10a, 10b together once the components have been installed therein. Such adhesives, as would be known to those of skill in the art, are not limitations of the present invention.

Figure 12A:
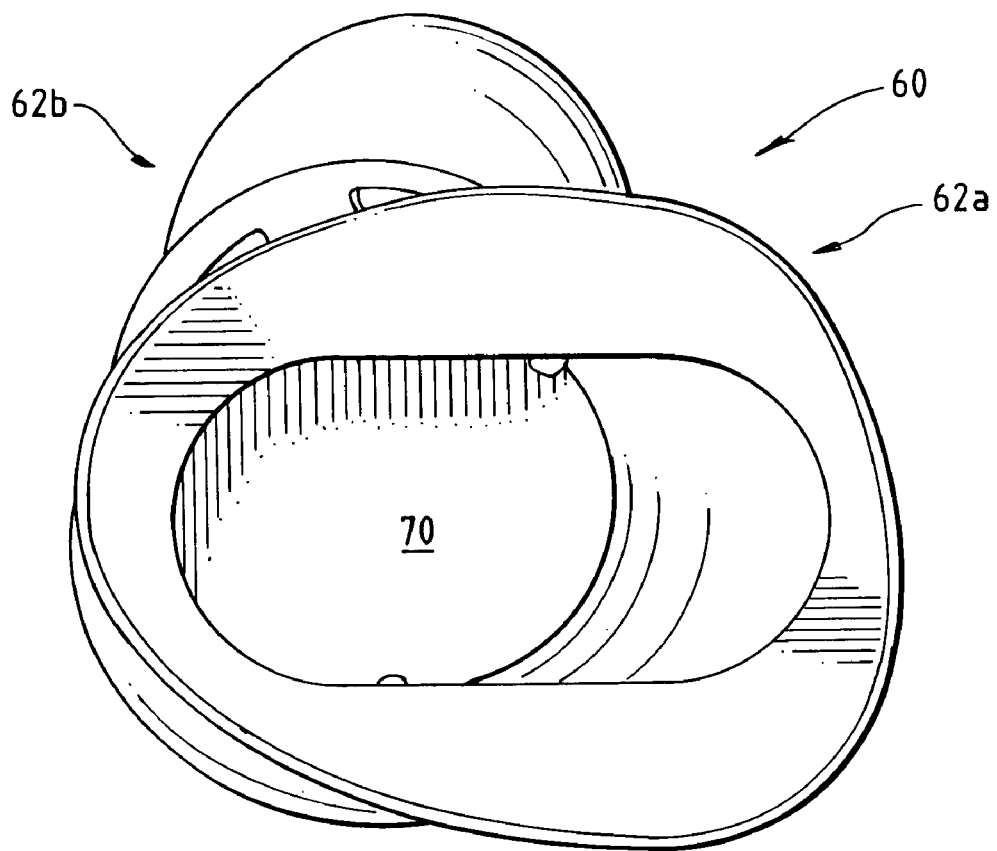
FIG. 12A is a top plan view of an alternate, laterally split housing configuration.
Figure 12B:
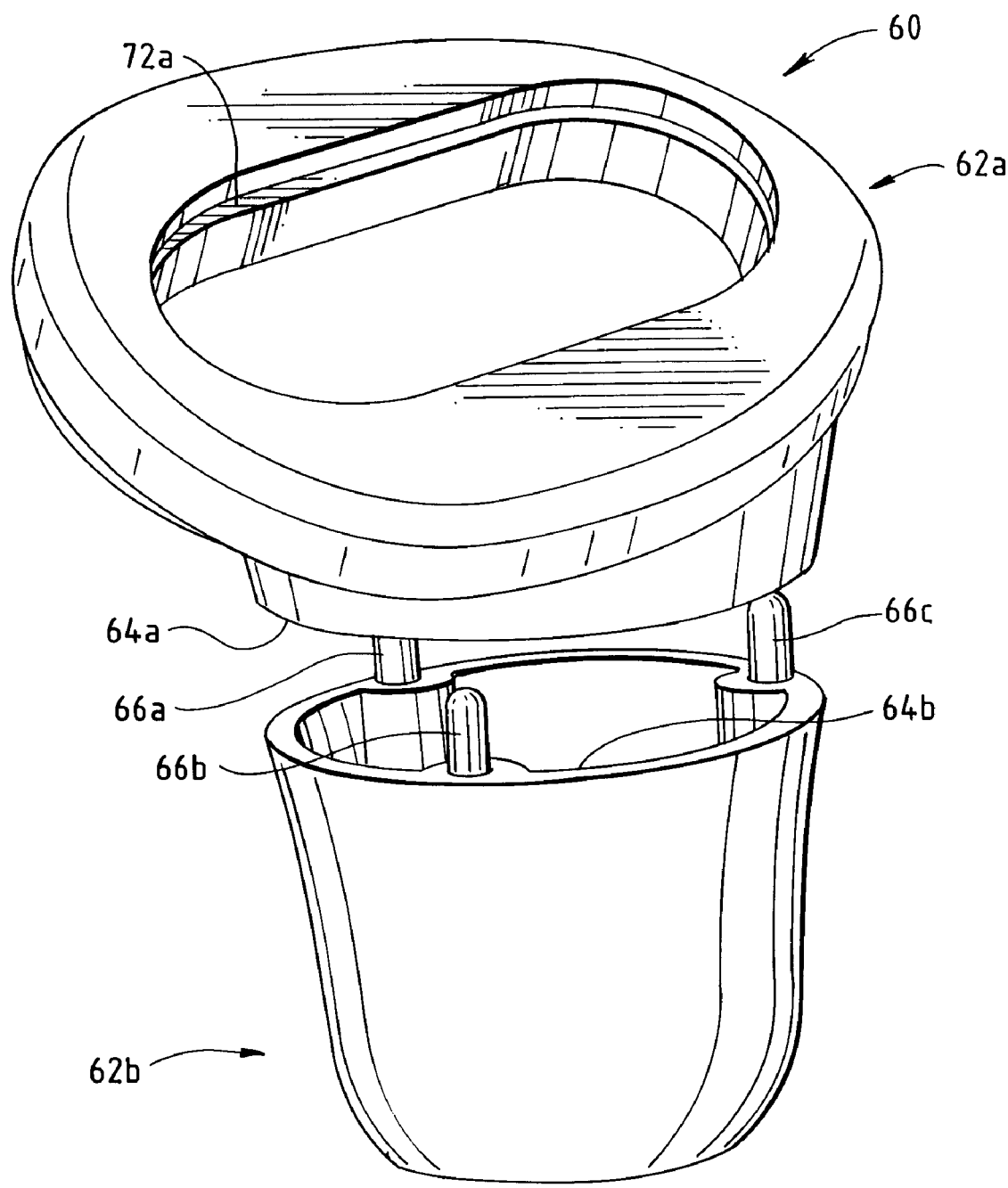
FIG. 12B is a side elevational view of the housing configuration of FIG. 12A.
Figure 12C:
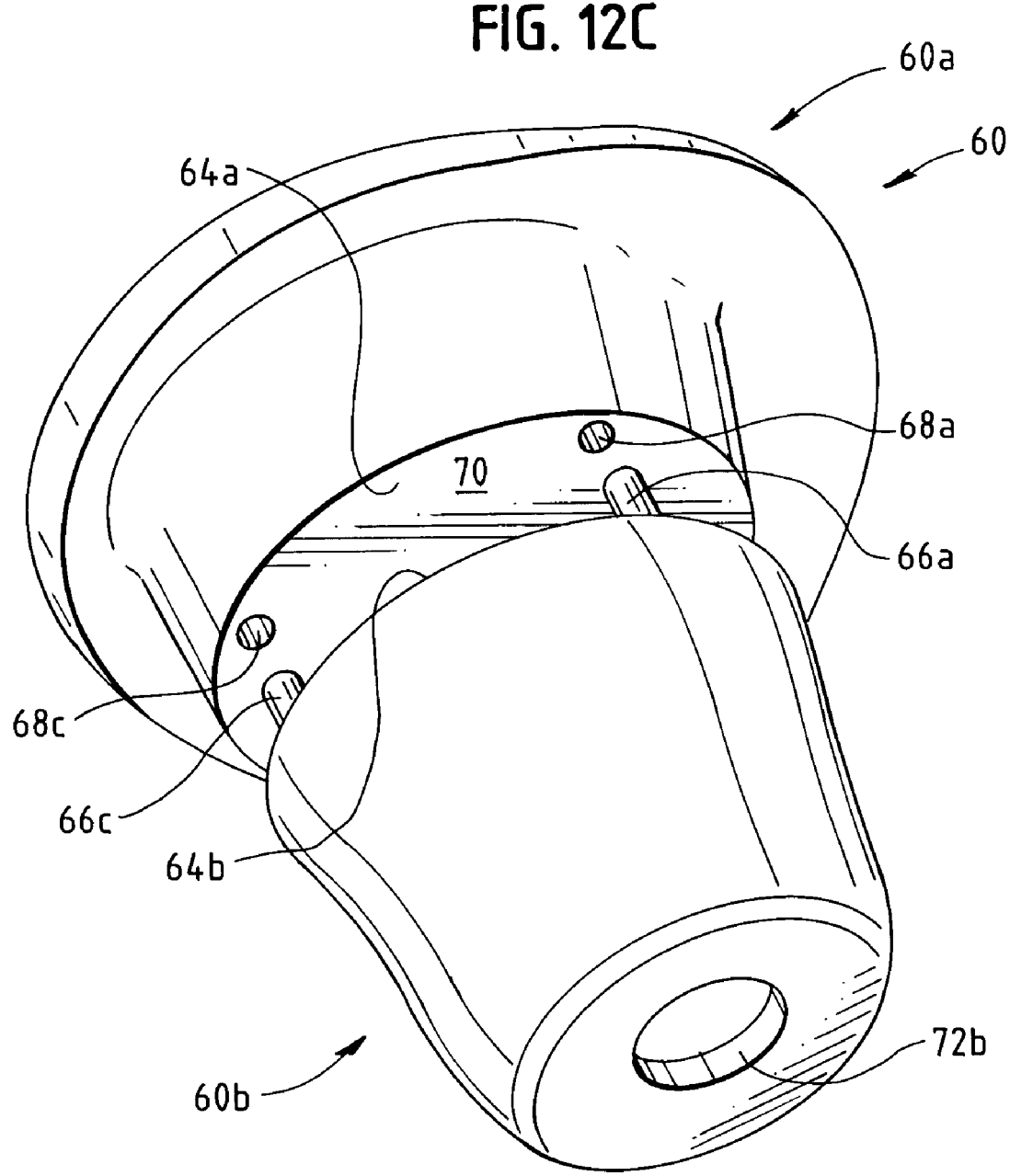
FIG. 12C is another side view of the laterally split housing configuration of FIG. 12A.

FIGS. 12A-12C illustrate views of yet another hearing aid housing 60 in accordance with the present invention. The housing 60 is formed with a proximal outer ear section 62*a* which is mechanically joined and attached to a distal end canal section 62*b*.

Sections 62*a*, 62*b* are joined along a lateral seam defined by surfaces 64*a* and 64*b*. The sections 62*a*, 62*b* are connected together using studs and recesses which engage with an interference or press fit. Illustrative studs are 66*a, b* and *c* which engage corresponding recesses 68*a, b, c*. It will be understood that other forms of latches, for example, as illustrated in FIGS. 11A-11B could also be used without departing from the spirit and scope of the present invention.

The surface 64*a* is formed on an isolation wall 70 which extends laterally, comparable to the isolation wall formed of sections 24*a*, b, discussed previously. Wall 70 separates the proximal end section 62*a* from the distal end section 62*b* acoustically and mechanically.

The proximal end section 62*a* defines a component receiving and supporting surface 72*a*, for example for the purpose of receiving and supporting a module such as the module 40-1. The interior open region of the distal section 62*b* can support a receiver, such as the receiver 40-2 or 40-3 discussed previously. The wall 70 separates the two component carrying regions.

Audio output from the respective receiver is emitted via output port 72*b* which can support a receiver, as discussed previously, or can merely carry a wax guard if desired.

The laterally split shell 60 provides assembly and test advantages comparable to those of the axially split shell 10 discussed previously. The module such as module 40-1 can be assembled and tested prior to installation. When installed, it can be electrically connected to the respective receiver before the sections 62*a*, 62*b* are mechanically connected together.

A method of assembling a hearing aid includes:
providing first and second separate housing sections with the sections each having an external periphery that corresponds to a portion of a user's ear canal;
installing an audio input transducer and an audio output transducer, spaced apart from one another in one of the housing sections; and
coupling the sections together to form a closed housing and at the same time interposing a wall between the transducers.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A hearing aid comprising:
first and second housing sections each elongated along a common centerline wherein the sections engage one another generally along the centerline to form a substantially closed housing insertable, at least in part, into a user's ear canal, the sections each close, at least in part, a first end of the housing, wherein the housing defines an interior component receiving region and a separate substantially self-contained electronic module that is carried by the housing sections at a second end thereof, the module closes at least in part, the second end;
wherein at least one of the housing sections carries a receiver supporting member which extends into the interior receiving region; and
wherein the supporting member comprises a compliant support.

2. A hearing aid as in claim 1 wherein the housing sections carry first and second respective locking features, and as the sections engage one another the locking features couple to one another thereby locking the sections together.

3. A hearing aid as in claim 2 wherein the housing is contained, at least in part, in an elastomeric sheath.

4. A hearing aid as in claim 2 which includes an audio output transducer carried in the housing.

5. A hearing aid as in claim 4 wherein the module carries a microphone wherein the output transducer and microphone are located relative to at least one of the housing sections before the housing sections are locked together.

6. A hearing aid as in claim 5 which includes a battery container carried at least in part in the housing.

7. A hearing aid as in claim 1 wherein the housing sections are substantially rigid.

8. A hearing aid as in claim 1 wherein the housing sections define first and second internal component receiving regions separated by an internal bounding wall with each region having a component supporting feature.

9. A hearing aid as in claim 1 which includes a microphone carried in the interior region supported on at least one of the housing sections.

10. A hearing aid as in claim 1 wherein a receiver, carried by the supporting member, has an audio output port positioned adjacent to an output end of the housing.

11. A hearing aid as in claim 1 wherein a receiver carried by the supporting member, has an audio output port oriented away from an output end of the housing.

12. A hearing aid as in claim 1 where each housing section carries an elongated peripheral surface, the surfaces contact one another when the sections engage one another and define a longitudinal seam.

13. A hearing aid as in claim 1 wherein the region is divided into two separate sections by a wall partly formed in each of the parts of the housing.

14. A hearing aid comprising a hollow housing, with first and second displaced ends, one of which is insertable at least in part into a user's ear canal, the housing has first and second elongated, separate, housing segments, each segment engages the other along a seam that extends through the ends and, a vent which is formed in only one of the segments, the vent extends from the first end to the second end.

15. A hearing aid as in claim 14 wherein each segment forms part of the same end.

16. A hearing aid as in claim 14 wherein the segments each carry locking elements, the locking elements engage one another as the segments come together.

17. A hearing aid as in claim 16 which includes an exterior elastomeric sheath that contains the housing.

18. A hearing aid as in claim 14 wherein at least one of the segments carries a component support feature that extends into the hollow housing.

19. A hearing aid as in clam 18 which includes a receiver in the housing carried by the component support feature.

20. A hearing aid as in claim 19 wherein the receiver has a central axis oriented so as to extend through the ends, or, extend transversely of the ends.

21. A hearing aid as in claim 18 which includes one of, a microphone or, signal processing circuitry, carried, in the housing, by the component support feature.

22. A hearing aid comprising:
a first housing part and a second, separate, housing part, the parts engage one another to form a housing which defines an internal region;

a receiver, the receiver installable on a housing part prior to joining the housing parts together;

a microphone installable on a housing part prior to joining the two parts together; and an ear canal vent formed in only one of the housing parts, the vent extending from a first end to a second end of the one housing part.

23. A hearing aid as in claim 22 which includes:

first and second latch elements each carried on a respective housing part, the latch elements lockingly engage one another to form a substantially closed housing.

24. A hearing aid as in claim 22 where the receiver carrying housing part defines an elongated concave interior surface that terminates at a bounding edge with the interior surface having a generally central concave region with lines normal to that region intersecting a plane that extends across the bounding edge.

25. A hearing aid as in claim 24 where the other housing part defines another elongated concave interior surface that terminates at a bounding edge with the interior surface having a generally central concave region with lines normal to that region intersecting a plane that extends across the bounding edge.

26. A hearing aid as in claim 22 which includes an extractor element for applying an extraction force generally parallel to a seam between the two housing parts.

27. A hearing aid insertable at least in part into a user's ear canal, the aid comprising:

an elongated housing with a longitudinal axis and an end insertable into the user's ear canal, and a displaced second end, the housing substantially bounding an internal component receiving region, the housing formed of first and second sections joined along an elongated seam line that extends generally along the longitudinal axis and a separate battery container located at the second end, the container having an access door outside of the housing, and, wherein at least one of the sections includes a receiver support member.

28. A hearing aid as in claim 27 wherein the sections are coupled together by at least one of an interference fit, a slidably engageable latch, a twist-lock or a snap fit.

29. A hearing aid as in claim 27 which includes a laterally extending isolation wall formed in each section, the walls mating when the first and second sections are joined, the mated walls blocking feedback within the housing.

30. A housing adapted to be insertable, at least in part, into an ear canal of a user, the housing comprising:

first and second matable housing sections, the housing sections being sized for the user's ear canal, when mated the sections define a substantially closed interior region and first and second spaced apart ends, one of the ends defines an audio output port, the other end carries a separate microphone module which defines an audio input port, an exterior periphery of the one end is configured to slidably engage a portion of the user's ear canal with a seam formed by the mated sections extending generally between the ends, the module has a selected size and shape usable with different sizes of housing sections.

31. A housing as in claim 30 with first and second engaging elements carried by respective housing sections, when mated, the engaging elements block separation of the sections.

32. A housing as in claim 30 wherein the other end defines a recess for a component module.

33. A housing as in claim 32 wherein the recess defines at least one groove for slidably receiving a component module.

34. A housing as in claim 33 wherein the groove is defined in part in each housing section and when mated, the housing sections lock the module thereto.

35. A housing as in claim 34 wherein at least one of the housing sections carries a receiver support structure which structure extends into the interior region.

36. A housing as in claim 35 wherein at least one of the housing sections carries internal blocking wall.

37. A housing as in claim 35 with a vent extending end-to-end in one of the sections.

38. A hearing aid insertable at least in part into a user's ear canal, the aid comprising:

an elongated housing with a longitudinal axis and an end insertable into the user's ear canal, and a displaced second end, the housing substantially bounding an internal component receiving region, the housing formed of first and second sections joined along an elongated seam line that extends generally along the longitudinal axis and a separate battery container located at the second end, the container having an access door outside of the housing, and, wherein at least one of the sections includes a compliant receiver support member.

* * * * *